(12) United States Patent
Fifield et al.

(10) Patent No.: US 10,159,128 B1
(45) Date of Patent: Dec. 18, 2018

(54) SELF DIMMING LED APPARATUS

(71) Applicant: Astronics Advanced Electronic Systems Corp., Kirkland, WA (US)

(72) Inventors: Jon M. Fifield, Kent, WA (US); Brien G McCrea, Woodinville, WA (US); Daniel P. Jackson, Bothell, WA (US); Anton Zlatev, Edmonds, WA (US)

(73) Assignee: Astronics Advanced Electronic Systems Corp., Kirkland, WA (US)

( * ) Notice: Subject to any disclaimer, the term of this patent is extended or adjusted under 35 U.S.C. 154(b) by 0 days.

(21) Appl. No.: 15/718,065

(22) Filed: Sep. 28, 2017

(51) Int. Cl.
*H05B 33/08* (2006.01)
*H05B 37/02* (2006.01)

(52) U.S. Cl.
CPC ..... *H05B 33/0854* (2013.01); *H05B 37/0218* (2013.01)

(58) Field of Classification Search
None
See application file for complete search history.

(56) References Cited

U.S. PATENT DOCUMENTS

| | | | |
|---|---|---|---|
| 2008/0067942 A1* | 3/2008 | Watanabe | H05B 33/0851 315/158 |
| 2013/0006051 A1* | 1/2013 | Stace | A61B 1/00071 600/109 |

* cited by examiner

*Primary Examiner* — Jany Richardson
(74) *Attorney, Agent, or Firm* — Wiggin and Dana LLP; Gregory S. Rosenblatt; Andrew D. Bochner

(57) ABSTRACT

A self-dimming light-emitting diode (LED) system is disclosed. The LED system may include a voltage regulation circuit, an ambient light sensor, and an LED. The LED system provides for a reduction in illumination intensity of an LED, proportional to a reduction in surrounding ambient light intensity. Surrounding ambient light intensity is detected by the ambient light sensor. The LED system provides an autonomous, reduced-power system for low ambient lighting environments.

13 Claims, 4 Drawing Sheets

SELF DIMMING LED APPARATUS

FIELD OF THE DISCLOSURE

The subject matter of the present disclosure generally relates to lighting systems, and more particularly relates to a self-dimming light-emitting diode (LED) system.

BACKGROUND OF THE DISCLOSURE

In current lighting systems, both land-based and airborne, the advantages of LED lighting bulbs are well-known and documented. Present designs of dimmable LED light bulbs operate on Direct Current (DC) circuits. LED light bulbs are also known to be adaptable to receive Alternating Current (AC) power via a voltage converter device. This allows for providing DC voltage to the LED bulb.

Various schemes and systems have been utilized to provide for adjustable illumination brightness settings of an LED by manipulating an on/off switch, or using a wireless control method, such as WiFi. For example, certain systems include a receiver on an LED that receives instructions, submitted by a user on another device via WiFi, to lower illumination brightness on a LED.

In a conventional LED system, there is a voltage regulation circuit, an ambient light sensor, and an LED. Current aircraft in-use power supply lights, such as those employed on a USB charger located in an aircraft seating arrangement, do not allow for adjustable illumination settings, such as variable brightness levels and ambient light adjustments.

Existing LED systems do not provide a reduction in illumination intensity proportional to the reduction in the surrounding ambient light intensity, in a small format size, such as for an in-use light (IUL). Existing IULs provide non-variable brightness, and must compromise between being dim enough for low cabin light environments and being bright enough in high cabin light environments.

Thus, it would be desirable to provide an in-use light (IUL) that automatically adjusts its brightness level based on cabin ambient light levels. It would be further desirable to provide such an IUL with variable brightness levels in a small format size.

The subject matter of the present disclosure is directed to overcoming, or at least reducing, the effects of the problems set forth above.

BRIEF SUMMARY OF THE DISCLOSURE

Disclosed is a self-dimming LED system that provides a reduction in illumination intensity of an LED illumination, proportional to the reduction in the surrounding ambient light intensity. The reduction in illumination intensity is performed based on a detection by an ambient light sensor. The system provides for a small format size (approximately 5.5 millimeters) cylindrical assembly, without requiring external wiring or wireless control schemes to provide a dimming function of the LED.

The disclosed subject matter presents several advantages over previously available systems and methods.

One advantage of the disclosed subject matter is that it provides a reduction in power consumption of an LED in a low ambient lighting environment.

Another advantage of the disclosed subject matter is that it provides a small format size in-use light.

Yet another advantage of the disclosed subject matter is that it provides a self-dimming LED, without external wiring.

Yet another advantage of the disclosed subject matter is that external wireless control schemes are not needed, and the LED system is completely autonomous.

Yet an additional advantage of the disclosed subject matter is the elimination of external intervention for dimming a LED(s) in low ambient light conditions.

Yet an additional advantage of the disclosed subject matter is the ability to customize lighting colors and levels.

BRIEF DESCRIPTION OF THE DRAWINGS

The foregoing summary, preferred embodiments, and other aspects of the subject matter of the present disclosure will be best understood with reference to a detailed description of specific embodiments, which follows, when read in conjunction with the accompanying drawings, in which.

Like reference numbers and designations in the various drawings indicate like elements. Arrows in the schematic drawings should be understood to represent logic pathways that are generally indicative of the flow direction of information or logic, and that such arrows do not necessarily represent traditional electrical pathways.

DETAILED DESCRIPTION OF THE DISCLOSURE

Figure 1:
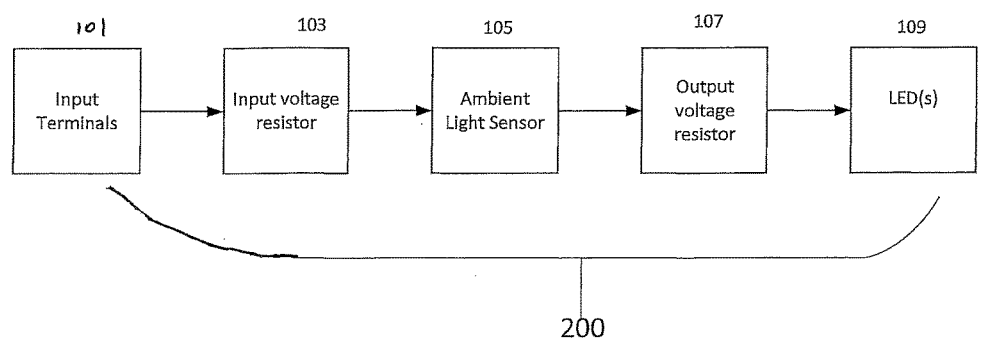
FIG. 1 is a diagram of an embodiment of the invention, illustrating a self-dimming LED system.

FIG. 1 is a block diagram of one embodiment of the self-dimming LED system assembly 200. In accordance with this embodiment, reduction in illumination intensity is provided for the LED(s). The illumination is reduced in proportion to the surrounding ambient light intensity, as detected by the ambient light sensor 105.

In accordance with an embodiment, the LED system contains an in-use light (IUL) in a small format size. For example, a 5.5 millimeter may be a form factor for the LED system. In an embodiment, the system does not include any external wiring, or wireless control schemes, to provide dimming functions. That is, LED system assembly 200 is autonomous, and does not utilize algorithms to reduce power consumption by reducing illumination intensity in a low ambient light environment.

According to an embodiment, the self-dimming LED system assembly 200 includes a power input terminal 101, an ambient light sensor 105, an input voltage resistor 103, and output voltage resistor 107, and an LED 109.

Power input terminal 101 receives power from a DC power source, which originates from a AC to DC or DC to DC power converter. In an embodiment, a voltage of 5 Volts DC may be supplied to the system. Any suitable DC power source may be capable of providing the power. For example, a voltage rating of 4.5-5.5 Volts DC, with a power source capacity of 25-50 milliamps, may be utilized in accordance with this embodiment. Ambient light sensor 105 is a sensor that detects change in ambient light. For example, ambient light sensor 105 may detect changes in ambient light intensity or brightness, or may be wavelength dependent. LED array 109 may be one LED, or a plurality of LEDs.

Figure 2:
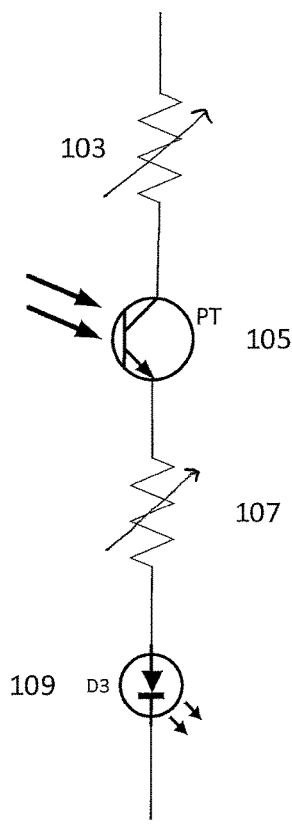
FIG. 2 is a diagram of an embodiment of the invention, illustrating a schematic view of a self-dimming LED system.

As illustrated in FIG. 2, a schematic view of the LED system assembly 200 of FIG. 1, either or both of input voltage resistor 103 or output voltage resistor 107 may be associated with resistance values. The resistance values of input voltage resistor 103 and output voltage resistor 107 may be varied depending on a desired illumination intensity of the LED(s). In an embodiment, resistor values may typically range from 150-2.5 kΩ dependent on the desired illumination intensity and the number of LEDs in the application. In an embodiment, the LED system circuit may be modeled using a commonly found circuit simulator software application, for example, PSPICE (or equivalent) in order to determine the appropriate resistance values for a given illumination intensity, and verification testing may be performed to verify the proper light intensity output is achieved.

Ambient light sensor 105 provides a variable current source, in accordance with the Equation:

$$Isource = \frac{Vsource - (VfLED + VCE)}{N \times (Rin + Rout)},$$

where Isource is source current per LED, Vsource is input voltage source, VfLED is forward drop of LED, VCE is Collector-emitter voltage of phototransistor, Rin is input resistor value, Rout is output resistor value, and N is Number of parallel LEDs. In an embodiment, the source current can vary anywhere from 5 mA in a bright state down to approximately 0A in a low, dim state. The resistor values are sized based on input voltage and maximum allowable source current per LED (typically 5 mA). Resistor values can typically range from 150-2.5 kΩ for a voltage source, varying between 5-28V to achieve the desired maximum source current. Maximum source current occurs when the light sensor is fully saturated and the source current can be computed by the equation above, substituting VCE with device saturation voltage (VCE=Vsat). The variable current source may be proportional to the ambient light condition. Thus, when ambient light conditions include low light levels, current provided through ambient light sensor 105 is decreased. When ambient light conditions are high, current provided through the ambient light sensor 105 is increased, causing ambient light sensor 105 to transmit a higher voltage level to the LED(s) 109.

In accordance with an embodiment, ambient light sensor 105 reduces the flow of current in reduced ambient lighting environment. In one embodiment, ambient light sensor 105 is a phototransistor, and thus changes its conductance, whereas in another embodiment, ambient light sensor 105 is a photocell, and thus changes its resistance proportional to the detected light intensity.

Whereas conventional phototransistors are utilized as a switch outputting a voltage level or measurement, the ambient light sensor 105 in accordance with the invention does not perform these tasks, and instead, provides greater or lesser current as a flow-through from the sensor.

In accordance with an embodiment, the LED(s) 109 are placed such that the LED illumination is unimpeded by other components and is visible external to the system. That is, the phototransistor may be placed to avoid interference of ambient light path by other components of the system, in order to detect changes in ambient light levels accurately. In accordance with another embodiment, placement of component design may prefer that the LED(s) 109 be placed such that the LED illuminates outside of the system.

In accordance with an embodiment, the ambient light sensor 105 may be a photobipolar transistor. That is, the transistor may be a bipolar transistor encased in a transparent case, to facilitate the receiving of ambient light in the base-collector junction. One or more photons may impinge on the base-collector junction, which generates electrons that are then injected into the base-collector junction. Current is then amplified by the phototransistor's current gain β.

Figure 3:
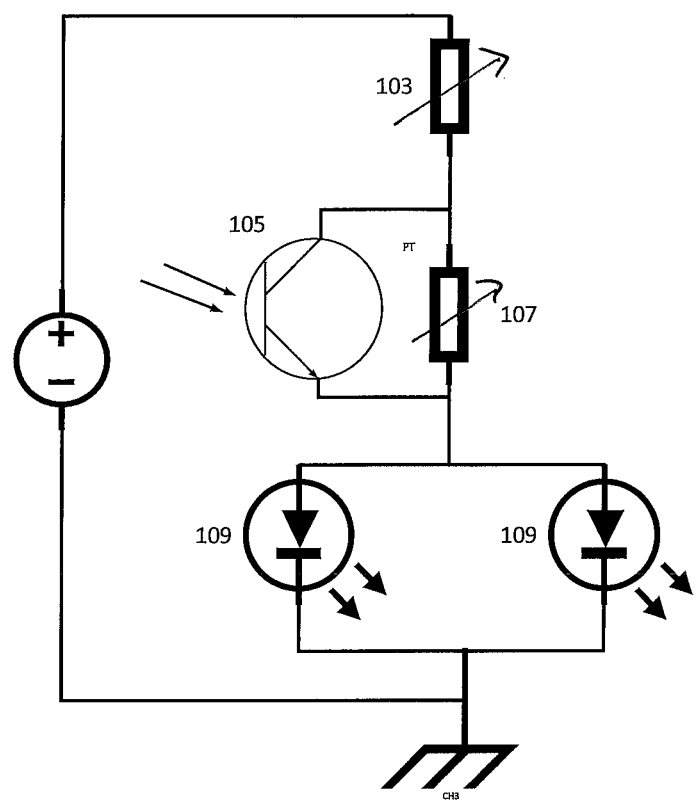
FIG. 3 is a diagram of another embodiment of the invention, illustrating a schematic view of a self-dimming LED system.

FIG. 3 illustrates an embodiment where the ambient light sensor 105 can be arranged in parallel with output voltage resistor 107. By placing the output resistor 107 in parallel with the ambient light sensor 105, precise control over the LED 109 bias current is accomplished in a low or "Dim" state. The circuit is not as dependent on the variation of the ambient light sensor 105 parameters because there is a current path though the input voltage resistor 103 and output voltage resistor 107 in a low state. The output voltage resistor 107 needs to be significantly larger than input voltage resistor 103.

Figure 5A:
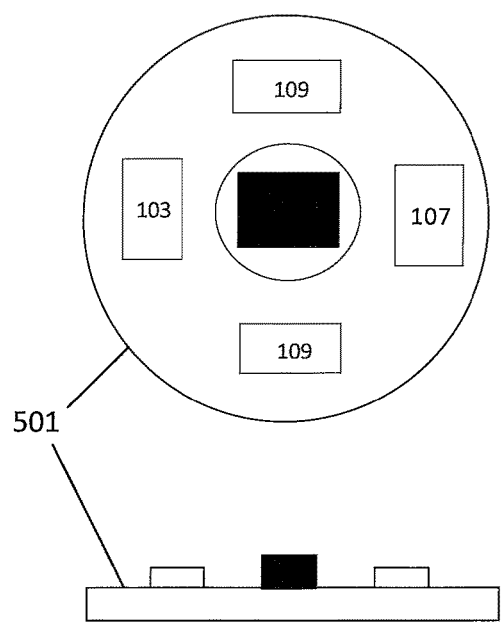
FIGS. 5A-5C illustrate various embodiments for the IUL, in accordance with the invention.
Figure 5B:
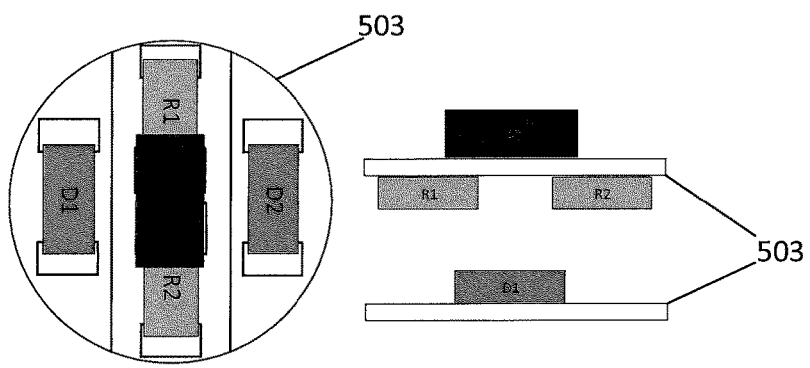
Figure 5C:
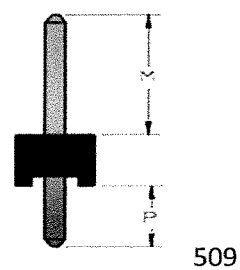

Referring now to FIGS. 5A-5C, a Printed circuit board (PCB) 501 in accordance with certain embodiments may include various components. As shown in FIG. 5A, PCB 501 includes the components of the LED system 200 (not shown) shown in a circular planer formatted arrangement. In another embodiment, in FIG. 5B, multiple, such as two, printed wire-boards 503 may be used. The two boards 503 may be connected via a connector device 509, also shown in FIG. 5B. Connector device 509, illustrated in FIG. 5C, is also referred to as a pogo pin.

Figure 4:
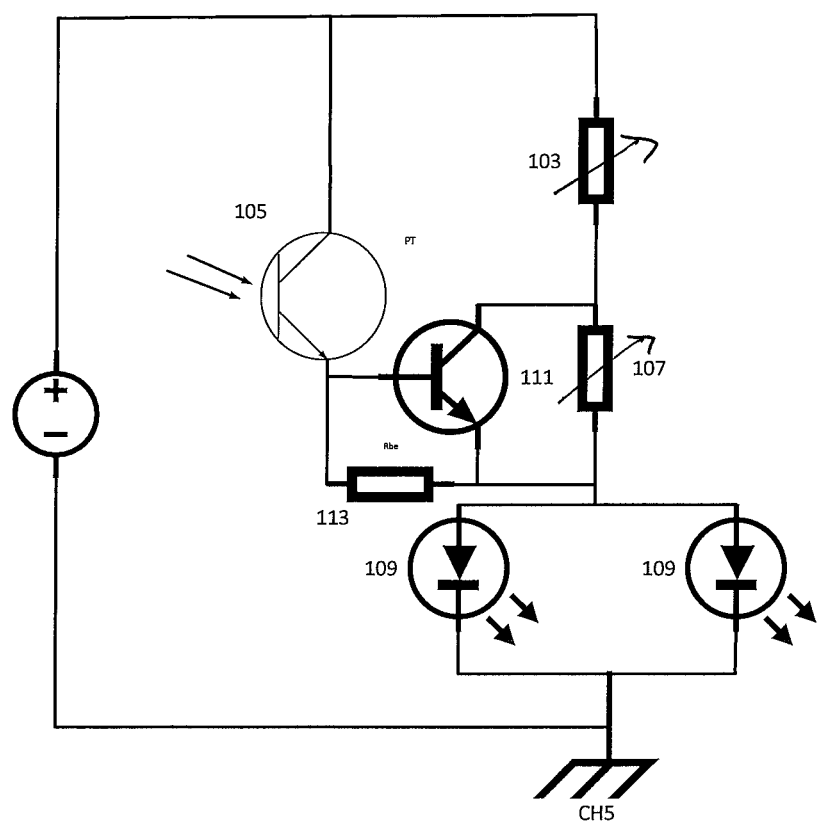
FIG. 4 is a diagram of another embodiment of the invention, illustrating a schematic view of a self-dimming LED system.

Additional embodiments may include integrating all components of the LED system assembly 200 onto one semiconductor substrate. In an additional embodiment, the LED dimming system utilized by LED system assembly 200 may utilize an analog to digital converter, a digital to analog converter, and/or a microcontroller. In yet a further embodiment, Darlington amplification may be utilized after the phototransistor to increase dynamic range and/or LED current drive capacity, as shown in FIG. 4.

An exemplary assembly may include a self-dimming LED system. The self-dimming LED system may include a power input terminal. The power input terminal receives power from any suitable source, such as a DC power source. The LED system further includes an ambient light sensor. The ambient light sensor is configured to detect change in ambient light intensity in the LED(s). The ambient light sensor may be a phototransistor, or any other suitable device. The ambient light sensor may include a resistor to control the power level output from the phototransistor. The output level may then be input to the LED(s).

In an embodiment, the self-dimming LED system may further include a resistor. The resistor may control the power level from the input terminal. The LED system may include one or more individual LED assemblies. Each of the LEDs may be of the same or different colors, hues, intensities or illumination levels. For example, an LED system may turn on one LED at a certain ambient light level and then turn on the other LED (or both to create a different color) for the other color. In a further example, this can be included inside a passenger cabin area, such as on an airplane, to replicate the evening or daytime lighting schemes.

In a further embodiment, a switch may be added (bipolar transistor or field effect transistor) between the LED and the ground terminal to allow for externally enabling or disabling the circuit. In yet another embodiment, the switch may set the maximum LED brightness by externally manipulating the switch duty cycle.

It should be understood that various components of the disclosed subject matter may communicate with one another in various manners. For instance, components may communicate with one another via a wire or, alternatively, wirelessly and by electrical signals or via digital information. It is noted that PWB may be utilized in the construction of many embodiments.

Although the disclosed subject matter has been described and illustrated with respect to embodiments thereof, it should be understood by those skilled in the art that features of the disclosed embodiments can be combined, rearranged, etc., to produce additional embodiments within the scope of the invention, and that various other changes, omissions, and additions may be made therein and thereto, without parting from the spirit and scope of the present invention.

What is claimed is:

1. A self dimming LED system, comprising: a power input terminal configured to receive power, an ambient light sensor configured to measure ambient light, an input voltage resistor, an output voltage resistor configured to adjust output voltage in response to ambient light detected by the ambient light sensor, and an LED configured to adjust a brightness of light, the brightness being adjustable based on the adjusted output voltage.

2. The system of claim 1, wherein the LED system is autonomous.

3. The system of claim 1, wherein the LED system is configured to provide a reduction in illumination intensity.

4. The system of claim 3, wherein the reduction in illumination intensity is provided proportional to a reduction in surrounding ambient light intensity.

5. The system of claim 1, wherein the ambient light sensor is configured to detect ambient light conditions and adjust the current through the output voltage resistor to a desired level based on the ambient light conditions.

6. The system of claim 5, wherein reduced output current from the input voltage resistor causes a reduction in power consumption by the LED system.

7. The system of claim 1, wherein the system is provided in an approximately 5.5 mm cylindrical assembly.

8. The system of claim 1, wherein the LED is self-dimming.

9. The system of claim 1, wherein the power input terminal is configured to receive DC power.

10. The system of claim 1, wherein the ambient light sensor is configured to detect a change in light intensity.

11. A self-dimming LED system comprising:
a power input terminal for receiving power from a DC power source;
a resistor to control power levels from the power input terminal;
an ambient light sensor to detect the change in ambient light intensity; and
an LED array.

12. The system of claim 11, wherein the ambient light sensor includes a phototransistor configured to measure ambient light intensity levels.

13. The system of claim 11, wherein the ambient light sensor further includes a resistor to control power level output from the phototransistor, the power level output being adjusted for input into the LED array.

* * * * *